United States Patent
Mueller et al.

(10) Patent No.: US 9,682,891 B2
(45) Date of Patent: Jun. 20, 2017

(54) SINTERED BALL

(71) Applicant: Sigmund Lindner GmbH, Warmensteinach (DE)

(72) Inventors: Achim Mueller, Goldkronach (DE); Karin Scheidt, Hof (DE); Fabian Peukert, Fitchtelberg (DE)

(73) Assignee: Sigmund Lindner GmbH, Warmensteinach (DE)

( * ) Notice: Subject to any disclaimer, the term of this patent is extended or adjusted under 35 U.S.C. 154(b) by 0 days.

(21) Appl. No.: 14/908,810

(22) PCT Filed: Jul. 31, 2014

(86) PCT No.: PCT/EP2014/066476
§ 371 (c)(1),
(2) Date: Jan. 29, 2016

(87) PCT Pub. No.: WO2015/014930
PCT Pub. Date: Feb. 5, 2015

(65) Prior Publication Data
US 2016/0168038 A1    Jun. 16, 2016

Related U.S. Application Data

(60) Provisional application No. 61/860,636, filed on Jul. 31, 2013.

(51) Int. Cl.
C04B 35/56 (2006.01)
C04B 35/488 (2006.01)
C04B 35/632 (2006.01)
C04B 35/645 (2006.01)
B28B 3/00 (2006.01)

(52) U.S. Cl.
CPC .......... *C04B 35/5626* (2013.01); *B28B 3/003* (2013.01); *C04B 35/488* (2013.01); *C04B 35/632* (2013.01); *C04B 35/6455* (2013.01); *C04B 2235/3206* (2013.01); *C04B 2235/3208* (2013.01); *C04B 2235/3224* (2013.01); *C04B 2235/3225* (2013.01); *C04B 2235/3246* (2013.01); *C04B 2235/3847* (2013.01); *C04B 2235/658* (2013.01); *C04B 2235/77* (2013.01); *C04B 2235/96* (2013.01)

(58) Field of Classification Search
CPC . C04B 35/488; C04B 35/5626; C04B 35/632; C04B 35/6455; C04B 2235/3206; C04B 2235/3208; C04B 2235/3225; C04B 2235/3246; C04B 2235/3847; C04B 2235/658; C04B 2235/77; C04B 2235/96; C04B 2235/3224; B28B 3/003; Y10T 428/2982
USPC .............................. 428/402; 264/12; 501/87
See application file for complete search history.

(56) References Cited

FOREIGN PATENT DOCUMENTS

DE    102011113854    *    3/2013
WO    WO2013/041373   *    3/2013

OTHER PUBLICATIONS

Irina Hussainova et al: Erosive wear of advanced composites based on WC Tribology international, vol. 46, No. 1, Jun. 8, 2011, pp. 254-260.*
Hussainova et al., "Erosive wear of advanced composites based on WC", Tribology International, Butterworth Scientific LDT, vol. 46, No. 1, Jun. 8, 2011, pp. 254-260 (Jun. 8, 2011).
International Preliminary Report on Patentability corresponding to International Patent Application No. PCT/EP2014/066476 dated Feb. 2, 2016. (Translation).
International Search Report corresponding to International Patent Application No. PCT/EP2014/066476 dated Oct. 31, 2014.
Jiang et al., "ZrO2—WC nanocomposites with superior properties," J. Eur. Cer. Soc., 27 (2007) pp. 1247-1251.
Written Opinion corresponding to International Patent Application No. PCT/EP2014/066476.
"Informal Comments" corresponding to International Patent Application No. PCT/EP2014/066476 dated Feb. 5, 2015.

* cited by examiner

*Primary Examiner* — Leszek Kiliman
(74) *Attorney, Agent, or Firm* — Jenkins, Wilson, Taylor & Hunt, P.A.

(57) ABSTRACT

The present invention relates to sintered balls comprising tungsten carbide (WC) and partially stabilized zirconium oxide, $nX:ZrO_2$, and to powder mixtures and green bodies for the production thereof, and to methods for the production of the green bodies and the sintered balls. The sintered balls have high densities, high wear resistance and a long service life.

17 Claims, 3 Drawing Sheets

SINTERED BALL

The present invention relates to sintered balls comprising tungsten carbide (WC) and partially stabilized zirconium oxide, $nX:ZrO_2$, and also to powder mixtures and green bodies for the production thereof, and also processes for producing the green bodies and the sintered balls.

BACKGROUND OF THE INVENTION

The wet milling technique is one of the key technologies for targeted setting of materials properties for the paint and varnish industry through to the food and pharmaceutical industry. Ceramic milling balls are used in stirred ball mills for wet milling a variety of materials, e.g. pigments, and for dispersing formulations. A substantial step forward in terms of the efficiency and contamination risk of such processes has already been achieved by the use of ceramic milling balls. In efforts being made to achieve more efficient processes and milling finenesses on the nanometer scale, the material density and thus the achievable energy input in the milling process play an important role in the wet milling process. Milling balls based on oxide ceramics which are available on the market at present have good wear resistance but the maximum density of commercially available milling balls, for example from Compagnie de Saint Gobain (www.zirpro.com), Jyoti Ceramic Industries Pvt. Ltd. (www.jyoticeramic.com) or Zircoa Inc. (www.zircoa.com), is less than 6.3 g/cm$^3$ (as at 2013).

It is therefore an object of the invention to provide sintered balls having an increased density, greater wear resistance and greater durability.

This object is achieved by a sintered ball comprising tungsten carbide, WC, and partially stabilized zirconium oxide, $nX:ZrO_2$.

Furthermore, the invention provides a powder mixture, a green body obtainable therefrom and also processes for producing the green body and the sintered ball from the green body.

Further preferred embodiments may be found in the dependent claims.

The invention is based on the idea of developing a process for producing milling balls which have the composition xVol. %-WC-yVol. %-$nX:ZrO_2$ and after having been produced have material densities of greater than or equal to 6.3 g/cm$^3$, high wear resistance and great durability.

The basis of the invention is formed by materials compositions comprising metallic hard material, namely tungsten carbide WC, and an oxide ceramic, namely partially stabilized zirconium oxide or zirconium(IV) oxide $nX:ZrO_2$, hereinafter also referred to as zirconium oxide in the interest of simplicity, by means of which higher milling media densities can be achieved and thus higher energy inputs in milling processes and efficient milling finenesses on the nanometer scale can be obtained. Although such materials compositions are already known, for example from D. Jiang et al., $ZrO_2$—WC nanocomposites with superior properties, J Eur. Cer. Soc. 27 (2007), 1247-1251, these have hitherto not been able to be processed to give milling media balls.

DESCRIPTION OF THE FIGURES

The invention will now be described in detail with reference to the accompanying Figures, although these do not restrict the invention.

DETAILED DESCRIPTION OF THE INVENTION

Definitions

Figure 1:
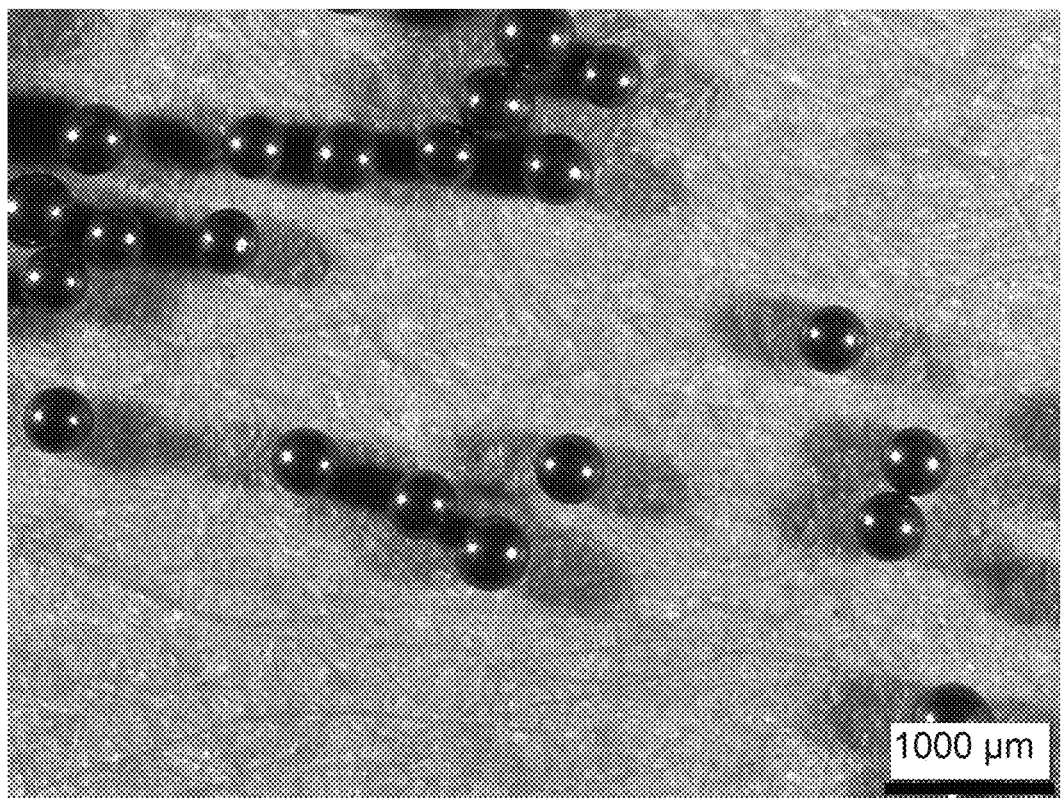
FIGS. 1, 2 and 3 show illustrative optical micrographs of sintered balls according to an embodiment of the present invention.

Balls are, for the purposes of the invention, round three-dimensional bodies which have a width to length ratio (b/l3, which represents a weighted average of a selected particle size calculated by means of the instrument-specific algorithm of the Retsch Camsizer®), in the range from 0.90 to 1.0. Here, b/l3 is the ratio of min (xc)/max (xFe) for values min (xc) and max (xFe) of a measured number (=3) of xc and xFe values.

Here, min (xc) is the shortest of all measured maximum chords of a particle projection. max (xFe) is the distance between two tangents which have been drawn on the particle perpendicular to the measurement directions; max: here means the greatest Feret diameter of a particle, determined from various measurement directions, averaged over all directions.

For the purposes of the invention, all amounts indicated have the unit % by weight, unless indicated otherwise.

In the formula $nX:ZrO_2$, the "n" is the mole fraction of the stabilizing agent and X is the compound stabilizing the zirconium oxide. It is not ruled out here that one or more compounds can be used for stabilizing the zirconium oxide.

Deionized water is, for the purposes of the invention, water from which ions have been withdrawn by a process such as ion exchange or reverse osmosis, so that it has a lower concentration of ions than mains water.

A sintered ball according to the invention comprises tungsten carbide (WC) and partially stabilized zirconium oxide, $nX:ZrO_2$.

As metal oxide X in the partially stabilized zirconium oxide in the sintered ball, preference is given to rare earth metal oxides, calcium oxide and magnesium oxide, more preferably oxides of yttrium, cerium, magnesium, calcium and/or scandium, particularly preferably $Y_2O_3$, $CeO_2$, MgO, CaO and/or $Sc_2O_3$, for partial stabilization, where a plurality of metal oxides can also be used in combination, for example $Y_2O_3$ and $Nd_2O_3$ or $Y_2O_3$ and $CeO_2$. The proportion by weight of X in $nX:ZrO_2$, calculated from the mole fraction n with the aid of the molar mass of the respective compound, can be from 2 to 25.0% by weight, preferably from 3 to 20% by weight, more preferably from 5.0 to 5.6% by weight, based on 100% by weight of $nX:ZrO_2$. Different proportions by weight can be provided for particular metal oxides. Thus, for example, a possible preferred proportion of $CeO_2$ is from 3 to 25.0% by weight, while for $Y_2O_3$, this can be from 4.5 to 6.0% by weight, preferably from 5.0 to 5.5% by weight. In particular embodiments, the zirconium oxide used according to the invention is partially stabilized with $Y_2O_3$. The content of $Y_2O_3$ in $ZrO_2$ can range from 4.5 to 6.0% by weight, preferably from 5.0 to 5.5% by weight.

In addition, the zirconium oxide can be mixed with further elements M, preferably oxides of aluminum and/or iron, particularly preferably with $Al_2O_3$ and/or $Fe_2O_3$, in the sintered ball. The content of further elements M, preferably oxides of aluminum and/or iron, particularly preferably $Al_2O_3$ and/or $Fe_2O_3$, can be from 0 to 2% by weight, preferably from 0.1 to 1.0% by weight, based on 100% by weight of $nX:ZrO_2$.

In preferred embodiments of the sintered ball, the proportion of WC in the materials composition is from 1 to 99.9% by volume, preferably from 1 to 60% by volume, more preferably from 10 to 40% by volume, and the proportion of $nX:ZrO_2$ is from 99 to 0.1% by volume, preferably from 99 to 40% by volume, more preferably from 90 to 60% by volume, based on 100% by volume of WC and $nX:ZrO_2$.

Furthermore, the sintered ball, preferably produced from tungsten carbide particles and partially stabilized zirconium oxide particles, has an average volumetric particle size d50 of in each case from 10 to 1500 nm, preferably from 30 to 500 nm, and a volumetric particle size d95 (particle size at which 95% of the particles in a mixture are smaller) of in each case from 500 to 3500 nm, preferably from 500 to 3000 nm, more preferably from 800 to 1200 nm. Here, the tungsten carbide particles can have been passivated by means of an organic additive, preferably stearic acid, as oxidation protection during production.

The sintered ball according to the invention can have a diameter of from 0.05 mm to 3 mm, preferably from 0.2 mm to 1.2 mm. The density of the sintered ball preferably ranges from 6.5 to 10.5 g/cm$^3$, more preferably from 6.8 to 9.8 g/cm$^3$. In addition, a Vicker's hardness in accordance with DIN EN ISO 6507 in the range from 14.5 to 16.5 GPa, preferably from 14.8 to 16.2 GPa, a fracture toughness in accordance with DIN EN 14425-3 in the range from 6.5 to 11.0 MPa$\sqrt{m}$, preferably from 6.9 to 9.4 MPa$\sqrt{m}$, and a flexural strength in accordance with DIN EN 843-1 in the range from 1800 to 2200 MPa, preferably from 1950 to 2050 MPa, in particular about 2000 MPa, can be observed for the sintered ball.

To produce the sintered ball, a materials composition comprising tungsten carbide (WC) and partially stabilized zirconium oxide, $nX:ZrO_2$, is firstly provided. This materials composition can preferably comprise tungsten carbide particles and partially stabilized zirconium oxide particles having an average volumetric particle size d50 of in each case from 10 to 2500 nm, preferably from 10 to 1500 nm, more preferably from 30 to 1500 nm, and particularly preferably from 30 to 500 nm, by means of which a preferred density can be achieved. In particular embodiments, the average volumetric particle sizes d50, of tungsten carbide and zirconium oxide which are to be processed according to the invention are thus 10-2500 nm, preferably 10-1500 nm, more preferably 30-1500 nm and particularly preferably 30-500 nm. In addition, the volumetric particle sizes d95 of tungsten carbide and zirconium oxide which are processed according to the invention range from 10 to 3500 nm, preferably from 10 to 2000 nm, more preferably from 40 to 2000 nm and particularly preferably from 40 to 1200 nm. The volumetric particle sizes d50 and d95 are determined either by means of a laser light scattering measurement method in accordance with DIN ISO 13320-1 and/or an acoustic particle size measurement method. In the materials composition, the tungsten carbide particles can, in preferred embodiments, have been passivated by means of organic additives, preferably stearic acid, in order to protect them against oxidation.

As metal oxide X for partially stabilizing the zirconium oxide in the materials composition, it is possible to use various metal oxides X selected from among rare earth oxides, calcium oxide and magnesium oxide, preferably oxides of yttrium, cerium, magnesium, calcium and/or scandium, particularly preferably by means of $Y_2O_3$, $CeO_2$, MgO, CaO and/or $Sc_2O_3$. It is also possible to use combinations of stabilizing metal oxides, for instance yttrium oxide $Y_2O_3$ and neodymium oxide $Nd_2O_3$ or $Y_2O_3$ and $CeO_2$. The content of X in $nX:ZrO_2$, calculated from the mole fraction n with the aid of the molar mass of the respective compound, can be from 3 to 20.0% by weight, preferably from 5.0 to 5.5% by weight, based on 100% by weight of $nX:ZrO_2$. Different proportions by weight can be provided for particular metal oxides. Thus, for example, a possible preferred proportion for $CeO_2$ is from 3 to 20.0% by weight, while that for $Y_2O_3$ can be from 4.5 to 6.0% by weight, preferably from 5.0 to 5.5% by weight.

In addition, the zirconium oxide can, in particular embodiments, be mixed with further elements M, preferably oxides of aluminum and/or iron, in particular with $Al_2O_3$ and/or $Fe_2O_3$. The content of further elements M, preferably oxides of aluminum and/or iron, particularly preferably $Al_2O_3$ and/or $Fe_2O_3$, can here be from 0 to 2% by weight, preferably from 0.1 to 1.0% by weight, based on 100% by weight of $nX:ZrO_2$.

The proportion of WC in the materials composition can be from 1 to 99.9% by volume, preferably from 1 to 60% by volume, more preferably from 10 to 40% by volume, and the proportion of $nX:ZrO_2$ can be from 99 to 0.1% by volume, preferably from 99 to 40% by volume, more preferably from 90 to 60% by volume, based on 100% by volume of WC and $nX:ZrO_2$. In addition, the materials composition can further comprise auxiliaries such as dispersants based on carboxylic acids and/or amino alcohols in a total amount of from 0 to 3% by weight, preferably from 0.1 to 1.0% by weight, and/or binders in an amount of from 0 to 3.5% by weight, preferably from 0.1 to 1.0% by weight, based on 100% by weight of the materials composition. The materials composition can additionally comprise a metallic binder phase, preferably cobalt, in a total amount of from 0 to 20% by weight, preferably from 6 to 10% by weight. In addition, deionized water can be present, with the weight ratio of materials composition to water, in each case in gram, preferably being from 90:10 to 50:50, more preferably from 70:30 to 60:40. The amount of deionized water which can be added to the materials composition can, however, be determined suitably from the amount of auxiliaries added and the amount of binder.

Furthermore, auxiliaries can be present in the materials composition in an amount of from 0 to 3% by weight, preferably from 0.1 to 1.0% by weight, and/or binders in an amount of from 0 to 3.5% by weight, preferably from 0.1 to 1.0% by weight, based on 100% by weight of the materials composition.

In particular embodiments, the materials composition can be homogenized or stabilized by addition of various auxiliaries and be admixed with binders having various compositions, i.e. can comprise auxiliaries and/or binders. The content of auxiliaries in the materials composition can be in the range from 0 to 3% by weight, preferably from 0.5 to 1.5% by weight, and the content of binders can be in the range from 0 to 3.5% by weight, preferably from 1.0 to 2.0% by weight, based on 100% by weight of the materials composition. In particular, the material composition can be admixed with a sintering aid, preferably a silicon and/or aluminum and/or boron compound such as $B_4C$.

According to the invention, a homogenous powder mixture is then prepared from such a material composition in a first process step, with production of powder mixture being able to be carried out, for example, by means of a spray drying process or a freeze drying process or a freeze granulation process or a dispersing process, preferably in a stirred ball mill. Here, the powder mixture obtained according to the invention from the process step has a narrow particle size distribution having a volume-based normal distribution (Gaussian distribution), measured by means of laser light scattering methods and/or acoustic particle size measurement methods. Thus, a powder mixture which is produced from a material composition comprising tungsten carbide, WC, and partially stabilized zirconium oxide, nX:ZrO2, by a spray drying process or a freeze drying process or a freeze granulation process or a dispersing process, preferably in a stirred ball mill, is comprised according to the invention. For the powder mixture to be able to be produced from the material composition, the material composition before the freeze drying process or the freeze granulation process or the dispersing process preferably further comprises deionized water, with the weight ratio of material composition to water being from 90:10 to 50:50, preferably from 70:30 to 60:40. The spray drying process, freeze drying process, freeze granulation process or dispersing process is not subject to any particular restrictions here, and the processes customarily used in industry can be appropriately employed. Preference is given to a freeze drying process or a wet dispersing process in a solvent such as water, ethanol or isopropanol in a stirred ball mill.

A slip is produced by addition of deionized water to the powder mixture. This slip is then processed by means of a droplet formation process to give a green body. The solids content of the slip is preferably in the range from 40 to 80% by weight, more preferably from 50 to 70% by weight. In addition, from 0 to 1.5% by weight, preferably from 0 to 1.0% by weight, of binder, and also from 0 to 1.5% by weight, preferably from 0 to 1.0% by weight, of an auxiliary can optionally be added, with the mixture subsequently being mixed and processing to give the green body then being able to take place by means of a droplet formation process.

Illustrated droplet formation processes are known from US 2004/0007789 A1, U.S. Pat. No. 5,484,559, U.S. Pat. No. 6,197,073 B1, U.S. Pat. No. 5,500,162, U.S. Pat. No. 4,043,507 and U.S. Pat. No. 3,579,721, which are fully incorporated by reference with regard to the droplet formation process. Thus, for example, the slip can be directed in slurry form through a nozzle onto a rotating plate, with fine homogeneous droplets then being formed on impingement and these then being conveyed through an immiscible liquid in order to separate off the water and form the green body. As an alternative, it is also possible to use, for example, a vibratory droplet formation process in which a slurry jet is directed through a perforated, vibrating plate which vibrates at a resonant frequency of the jet, so that uniform droplets are formed. Here too, a gas can be directed onto the droplets. However, the droplet formation process is not subject to any particular restrictions according to the invention.

In this way, a green body is produced by means of the process of the invention for producing a green body. A green body according to the invention thus comprises, in particular embodiments, the powder mixture of the invention. In addition, the green body can additionally comprise from 0 to 1.5% by weight, preferably from 0 to 1.0% by weight, of binder and from 0 to 1.5% by weight, preferably from 0 to 1.0% by weight, of an auxiliary. The green body can preferably attain a green body density in the range from 75 to 99% of the theoretical density of the material composition, more preferably from 88 to 99%, particularly preferably from 93 to 99% and in particular from 93 to 97%. In addition, the green body can be in the form of a ball having a width to length ratio (b/l3) in the range from 0.90 to 0.99, preferably from 0.93 to 0.98, more preferably from 0.93 to 0.97. In addition, the green density/density of the green body can be in the range from 90 to 99% of the theoretical density of the material mixture, preferably from 93 to 99%, more preferably from 93 to 97%.

The green body can, according to the invention, then be sintered in a process in a first sintering step at temperatures in the range from 1200 to 1800° C., preferably from 1200 to 1700° C., more preferably from 1350 to 1600° C., particularly preferably from 1400 to 1600° C., with the end values being included in each case, under a protective gas atmosphere consisting of helium, argon or nitrogen or mixtures thereof, preferably nitrogen, or under reduced pressure or under a reducing atmosphere, preferably composed of a mixture of argon and hydrogen, or under gas pressure, preferably argon or nitrogen, and under a pressure in the range from 0.1 to 1.5 MPa, preferably from 0.2 to 1.0 MPa, optionally with a sintering aid. Sintering can, for example, be carried out in a sintering cell. Thus, for example, a sintered ball according to the invention can be obtained by sintering of a green body according to the invention. The ball according to the invention which has been sintered at these temperatures can subsequently be hot isostatically afterdensified in a second sintering step. This process, known as an HIP process according to the prior art, can be carried out at, for example, temperatures in the range from 1200 to 1700° C., more preferably from 1300 to 1600° C., particularly preferably from 1400 to 1550° C., with the end values being included in each case, at a pressure generated by a protective gas atmosphere, for example consisting of argon or nitrogen or mixtures thereof, preferably nitrogen, of preferably from 1500 to 3500 bar, more preferably from 2000 to 3000 bar, particularly preferably from 2300 to 2600 bar. Improved wear resistance can be achieved by means of the second sintering step. Here, the wear resistance can be determined using a horizontal laboratory stirred ball mill with the following parameters:

Milling chamber: SiC
Stirrer: polyethylene (PE)
Degree of filling: 55% by volume
Speed of rotation: 3821 rpm (Δ 10 m/s)
Milling medium: water
Test duration/cycles: 9 h, 24 h, 36 h, 48 h The results are then determined as mass difference before and after the wear measurement and also as decreasing mass per unit time (%/h).

A sintered ball according to the invention can be aftertreated by means of a polishing process, for example in water or by addition of a polishing powder such as silicon carbide abrasive and/or aluminum oxide abrasive and/or of a surface-active auxiliary, e.g. a surfactant, as is routinely carried out for, for example, milling media. When a plurality of sintered balls are being produced or when a relatively large quantity of sintered balls is present, it is also possible to obtain balls having various sizes in the same process using the same starting material composition, so that such balls can subsequently be sorted according to size by means of a sorting process, for example by means of a sieve or a sifter or a hydrocyclone.

EXAMPLES

The invention will now be described in detail by way of example with the aid of illustrative embodiments, but is not restricted to these.

Example 1

$ZrO_2$, partially stabilized with 5.6 wt % of $Y_2O_3$, was mixed with WC in a volume ratio of 80:20. A dispersant (Dolapix CE 64 or Dolapix A88 from Zschimmer & Schwarz GmbH & Co KG) was added in various amounts ranging from 0.2 to 1.5% by weight to this mixture, with a proportion of 1.0% by weight being found to be optimal.

Deionized water was added to such a mixture in a weight ratio of solid to water of 68:32 in order to obtain a suitable mixture in respect of the viscosity.

Ammonium alginate (NH4 alginate) was added thereto as binder in an amount of from 0.4 to 1.4% by weight, with an amount of 1.2% by weight of binder being found to be optimal here.

Measurement of the viscosity by means of a rheometer in accordance with DIN 53019-1 on the slip obtained in this way gave a value of max. 2500 mPas.

Dimensionally stable green bodies having sizes of from 0.3 to 2.5 mm were then obtained from the slip by means of a droplet formation process by means of nozzles and/or cannulas by immersion and reaction in a calcium or aluminum lactate solution or an inorganic acid solution or an organic acid solution.

These were subsequently converted into sintered balls according to the invention by means of a sintering process. Sintering was carried out under reduced pressure and/or under a nitrogen atmosphere at atmospheric pressure. The sintering temperature was in the range from 1350 to 1550° C., with a temperature of 1550° C. being found to be optimal here. The balls which have been sintered in this way were subsequently hot isostatically after-densified at a temperature in the range from 1400 to 1600° C., with a temperature of 1500° C. being found to be optimal here. The pressure generated by a nitrogen gas atmosphere was in the range from 2000 to 3000 bar, with a pressure of 2500 bar being found to be optimal.

The wear resistance of the balls was determined in each case after the first sintering step in the range from 1350 to 1550° C. and after isostatic after-densification, viz. the second sintering step. As mill, use was made of a WAB (Willy A. Bachofen, Switzerland) model Researchlab.

The following parameters were used:
Milling chamber: SiC
Stirrer: polyethylene (PE)
Degree of filling: 55% by volume
Speed of rotation: 3821 U/min ($\triangle$ 10 m/s)
Medium in which milling took place: water
Test duration/cycles: 9 h The results are then determined as mass difference before and after the wear measurement and as decreasing mass per unit time (%/h).

After the first sintering step, a wear of 0.87%/h was found (at a test duration of 9 h). In the case of balls after the second sintering step, a wear of 0.07%/h was found (test duration 9 h), i.e. an improvement by a factor of ~12.

Given these greatly improved wear values, the tests of the isostatically after-densified balls were extended to 48 h. The balls, which were heavy compared to conventional milling balls, displayed a wear of 0.18%/h.

Figure 2:
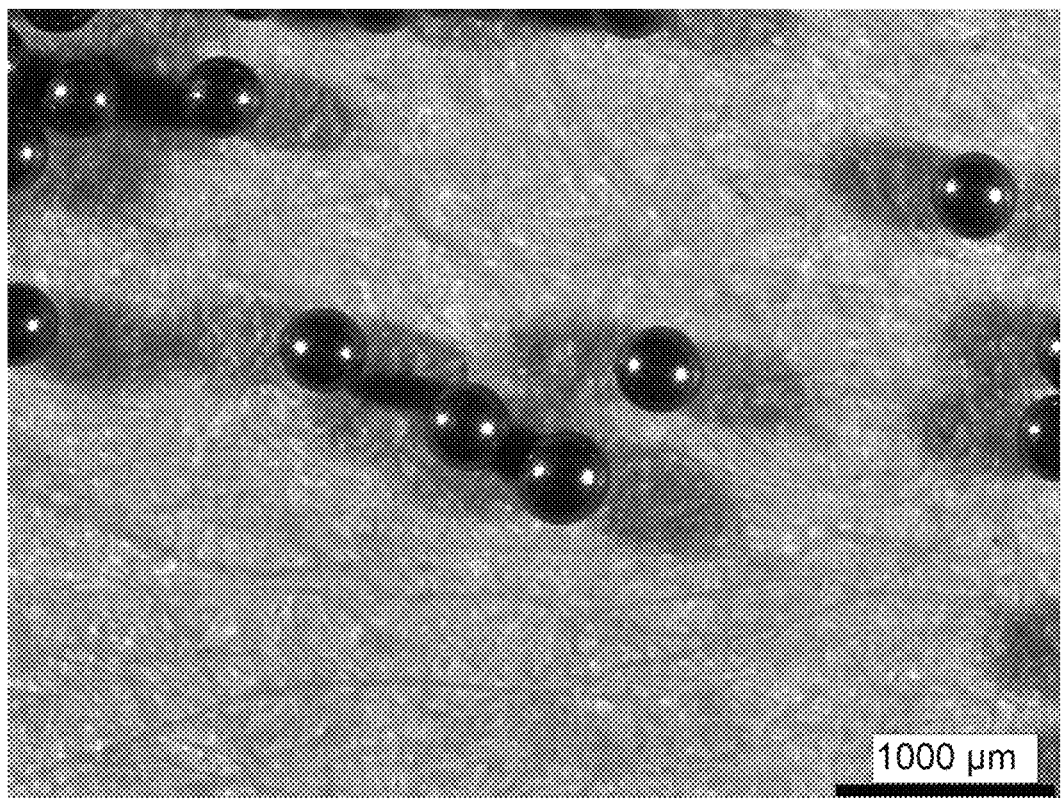
Figure 3:
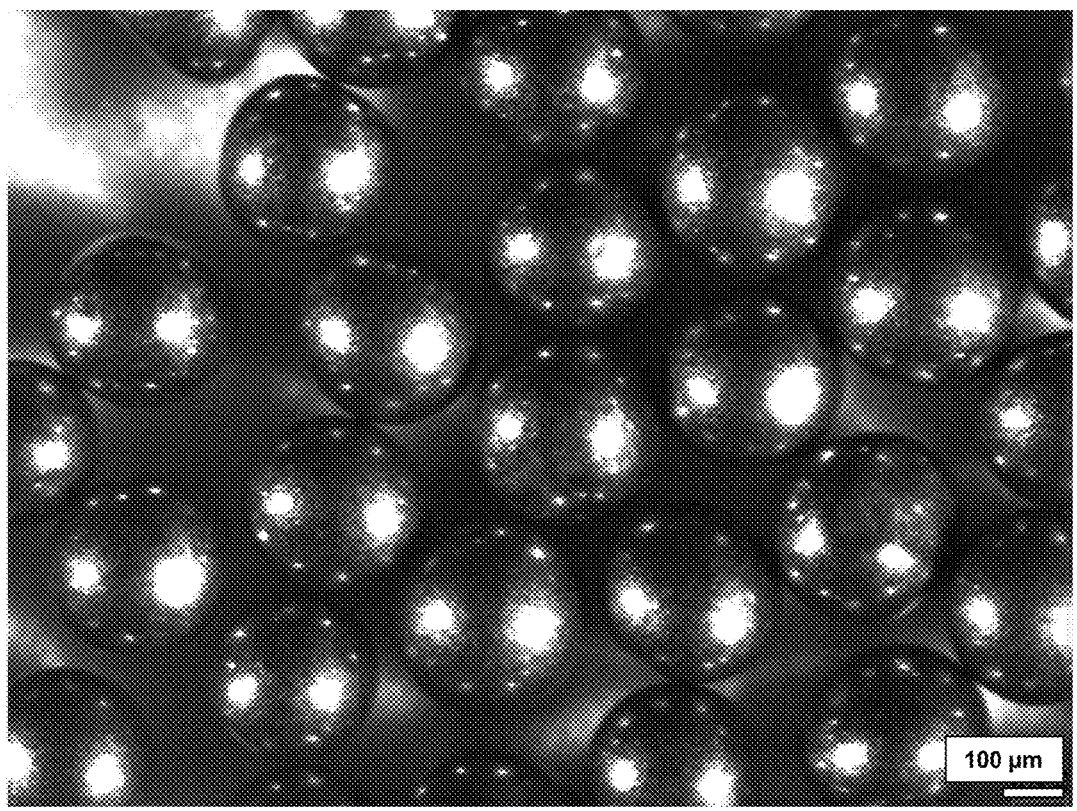

Sintered balls formed by this process are shown by way of example in FIGS. 1 to 3, which show optical micrographs of sintered balls.

In addition, an analysis by means of a Retsch Camsizer® to determine the value of the width to length ratio (b/l3) was carried out on the sintered balls.

As particle count, 500470 was determined by means of the CCD-B and 48 847 was determined using the CCD-Z.

The values from the measurement are reported in table 1 below, with the values P3 and Q3 indicating the fraction and the cumulative distribution, based on the volume (http://www.horiba.com/fileadmin/uploads/Scientific/Documents/PSA/Manuals/CAMSIZER_Characteristics_Nov2009.pdf).

TABLE 1

Measured values for illustrative sintered balls

| Particle [mm] fraction | P3 [%] | Q3 [%] | b/l3 |
|---|---|---|---|
| 0.000-0.100 | 0.00 | 0.00 | 0.824 |
| 0.100-0.150 | 0.00 | 0.00 | 0.780 |
| 0.150-0.200 | 0.01 | 0.01 | 0.926 |
| 0.200-0.250 | 0.05 | 0.06 | 0.946 |
| 0.250-0.300 | 0.19 | 0.25 | 0.951 |
| 0.300-0.350 | 9.29 | 9.54 | 0.955 |
| 0.350-0.400 | 54.13 | 63.67 | 0.959 |
| 0.400-0.450 | 15.65 | 79.32 | 0.949 |
| 0.450-0.500 | 14.94 | 94.26 | 0.940 |
| 0.500-0.550 | 5.05 | 99.31 | 0.926 |
| 0.550-0.600 | 0.67 | 99.98 | 0.920 |
| 0.600-0.650 | 0.00 | 99.98 | |
| 0.650-0.700 | 0.01 | 99.99 | |
| 0.700-0.750 | 0.00 | 99.99 | |
| 0.750-0.800 | 0.00 | 99.99 | |
| >0.800 | 0.01 | 100.00 | 0.921 |

A b/l3 value of 0.952 was found for the sintered balls, and as particle sizes Q3 [%] for 10.0, 50.0 and 90.0× value [mm] was found to be 0.351, 0.386 and 0.486.

Example 2

The densities found for the sintered balls are compared with the theoretically possible densities for mixtures of tungsten carbide with zirconium oxide partially stabilized with yttrium oxide. The theoretically achievable densities are reported in table 2 and can be calculated according to the following formula:

$$\frac{Vol.\ \%\ (WC) \cdot \rho(WC)^{\#}}{100} + \frac{Vol.\ \%\ (ZrO_2) \cdot \rho(ZrO_2)^{\#}}{100}$$

: Density in g/cm$^3$

TABLE 2

Theoretically achievable densities

| Raw material | Pure density [g/cm$^3$] | Mixing ratio 90/10 | Mixing ratio 80/20 | Mixing ratio 70/30 | Mixing ratio 60/40 |
|---|---|---|---|---|---|
| 3Y-TZP | 6.07 | 7.03 | 7.98 | 8.94 | 9.89 |
| WC | 15.63 | | | | |

3Y-TZP = 5.6% by weight of $Y_2O_3$ to 94% by weight of $ZrO_2$ + 0.2% by weight of SiO2 + 0.2% by weight of (Al2O3 + CaO + TiO2)

It was found that the densities of the sintered balls were in the range from 80 to 99% of the theoretically achievable densities.

The sintered balls according to the invention display an increased density compared to sintered balls known hitherto and are therefore outstandingly suitable as, for example, milling media. At the same time, the milling media based on the invention display a high wear resistance and thus durability.

The invention claimed is:

1. A sintered ball comprising tungsten carbide (WC) and partially stabilized zirconium oxide (nX:ZrO$_2$) wherein the proportion of WC in the material composition is from 1 to 60% by volume of the WC and nX:ZrO$_2$ and the proportion of nX:ZrO$_2$ in the material composition is from 99 to 40% by volume of the WC and nX:ZrO$_2$.

2. The sintered ball of claim 1, wherein the tungsten carbide has been passivated by contact with at least one organic additive.

3. The sintered ball of claim 1, wherein the zirconium oxide has been partially stabilized by a metal oxide X selected from among rare earth oxides, calcium oxide, and magnesium oxide.

4. The sintered ball of claim 1, wherein the proportion by weight of X in the nX:ZrO$_2$, calculated from the mole fraction n with the aid of the molar mass of the respective compound, is from 2 to 25.0% by weight of the nX:ZrO$_2$.

5. The sintered ball of claim 1, wherein the zirconium oxide further comprises one or more further elements M.

6. The sintered ball of claim 5, wherein the content of the one or more further elements M is from 0 to 2% by weight of the nX:ZrO$_2$.

7. The sintered ball of claim 1, wherein the sintered ball has been admixed with a sintering aid.

8. The sintered ball of claim 1, wherein the sintered ball has a diameter of from 0.05 mm to 3 mm.

9. A powder mixture produced from a material composition comprising tungsten carbide (WC) and partially stabilized zirconium oxide (nX:ZrO$_2$) by a spray drying process, a freeze drying process, a freeze granulation process, or a dispersing process, wherein the proportion of WC in the material composition is from 1 to 60% by volume of the WC and nX:ZrO$_2$ and the proportion of nX:ZrO$_2$ in the material composition is from 99 to 40% by volume of the WC and nX:ZrO$_2$.

10. A green body comprising the powder mixture of claim 9.

11. The green body of claim 10, wherein the green body is in the form of a sphere having a width-to-length ratio (b/l3) in the range from 0.90 to 0.99.

12. A process for producing the green body of claim 10, comprising:
   (a) mixing a powder mixture produced from a material composition comprising tungsten carbide (WC) and partially stabilized zirconium oxide (nX:ZrO$_2$) by a spray drying process, a freeze drying process, a freeze granulation process, or a dispersing process, wherein the proportion of WC in the material composition is from 1 to 60% by volume of the WC and nX:ZrO$_2$ and the proportion of nX:ZrO$_2$ in the material composition is from 99 to 40% by volume of the WC and nX:ZrO$_2$ with:
      (i) deionized water until a solids content in the range from 40 to 80% by weight has been reached:
      (ii) from 0 to 1.5% by weight of binder; and
      (iii) from 0 to 1.5% by weight of an auxiliary to produce a slip; and
   (b) subsequently processing the slip by droplet formation to give a green body.

13. A process for producing the sintered ball of claim 1, comprising sintering a green body comprising a powder mixture produced from a material composition comprising tungsten carbide (WC) and partially stabilized zirconium oxide (nX:ZrO$_2$) by a spray drying process, a freeze drying process, a freeze granulation process, or a dispersing process, wherein the proportion of WC in the material composition is from 1 to 60% by volume of the WC and nX:ZrO$_2$ and the proportion of nX:ZrO$_2$ in the material composition is from 99 to 40% by volume of the WC and nX:ZrO$_2$ at a temperature in the range from 1200 to 1800° C. under a protective gas atmosphere consisting of helium, argon, nitrogen, or a mixture thereof, or under reduced pressure or under a reducing atmosphere, or under gas pressure, and under a pressure in the range from 0.1 to 1.5 MPa, and optionally with a sintering aid.

14. The process of claim 13, further comprising hot isostatically after-densifying the sintered ball at temperatures in the range from 1200 to 1700° C. and at a pressure generated by a protective gas atmosphere of from 150 to 350 MPa (from 1500 to 3500 bar) in a second sintering step.

15. The sintered ball of claim 2, wherein the at least one organic additive is stearic acid.

16. The powder mixture of claim 9, wherein the powder mixture is produced in a stirred ball mill.

17. The green body of claim 11, wherein the green body is in the form of a sphere having a width-to-length ratio (b/l3) in the range from 0.93 to 0.98.

* * * * *